E. D. JEFFERSON.
APPARATUS FOR TREATING FIBROUS MATERIAL.
APPLICATION FILED JAN. 13, 1915.
1,204,357.
Patented Nov. 7, 1916.
2 SHEETS—SHEET 1.
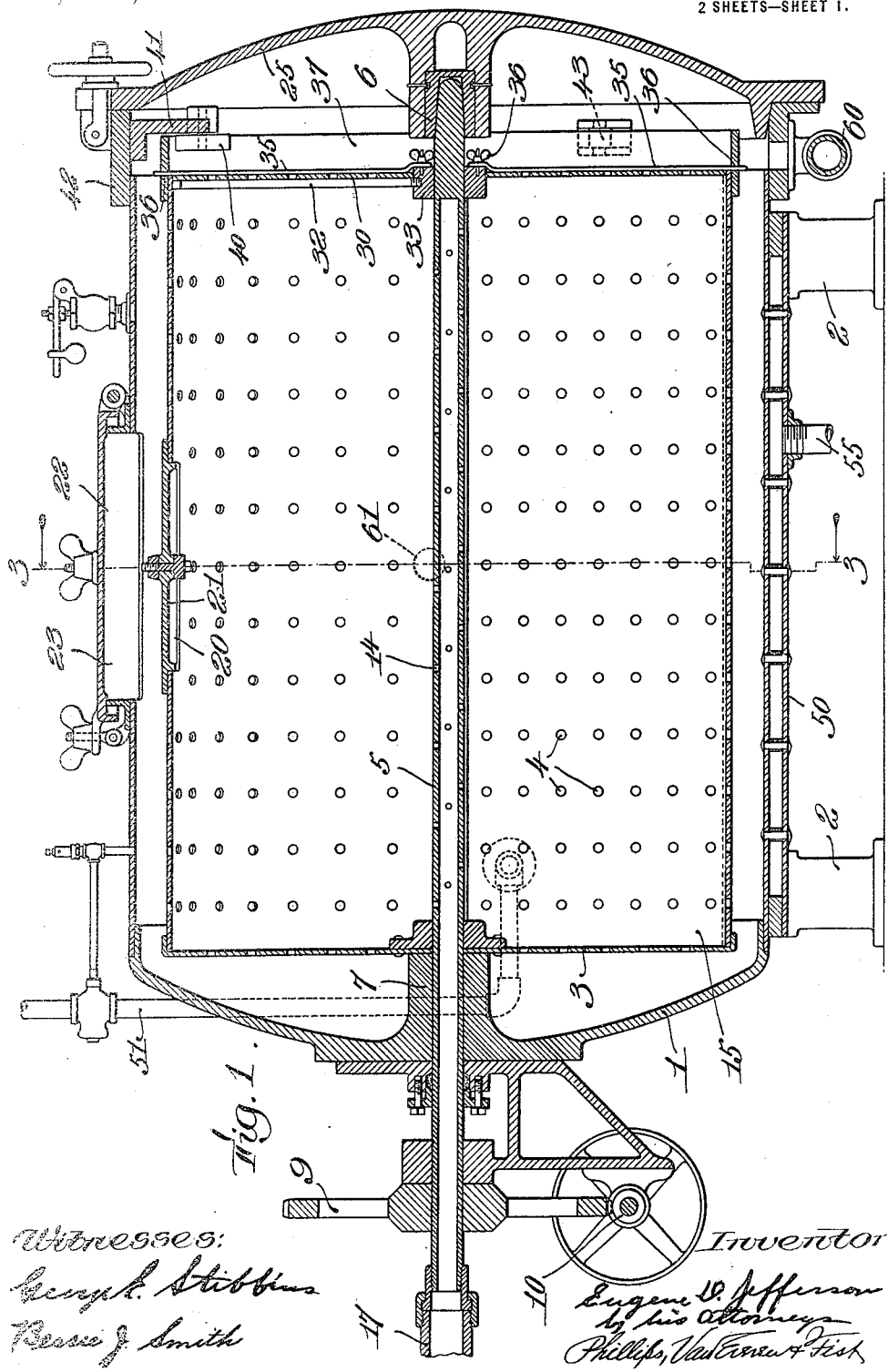

E. D. JEFFERSON.
APPARATUS FOR TREATING FIBROUS MATERIAL.
APPLICATION FILED JAN. 13, 1915.
1,204,357.
Patented Nov. 7, 1916.
2 SHEETS—SHEET 2.
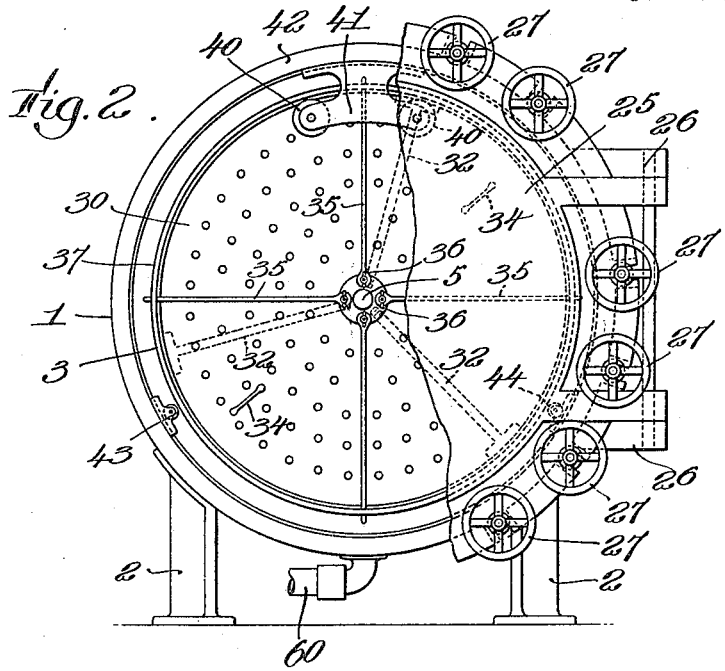
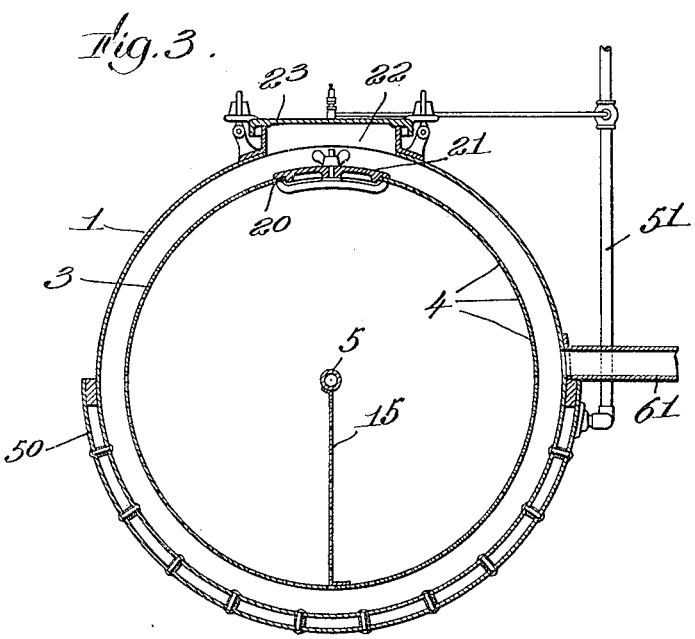

UNITED STATES PATENT OFFICE.

EUGENE D. JEFFERSON, OF BOSTON, MASSACHUSETTS.

APPARATUS FOR TREATING FIBROUS MATERIAL.

1,204,357.  Specification of Letters Patent.  Patented Nov. 7, 1916.

Application filed January 13, 1915. Serial No. 1,960.

*To all whom it may concern:*

Be it known that I, EUGENE D. JEFFERSON, a citizen of the United States, residing at Boston, in the county of Suffolk and State of Massachusetts, have invented certain new and useful Improvements in Apparatus for Treating Fibrous Materials; and I do hereby declare the following to be a full, clear, and exact description of the invention, such as will enable others skilled in the art to which it appertains to make and use the same.

The present invention relates to apparatus for treating fibrous material and more particularly to apparatus from which the material may be rapidly discharged after it is treated.

The present invention is an improvement in the apparatus described in my co-pending application Serial No. 671,226, issued on July 25, 1914, as Letters Patent No. 1,128,451.

The object of the invention is to improve this type of apparatus so that the materials after treatment may be easily and quickly discharged.

In the drawings which illustrate the preferred embodiment of the present invention, Figure 1 is a central vertical section through a boiling tank; Fig. 2 is an end view with a part of the end closure of the tank broken away; and Fig. 3 is a section on the line 3—3 of Fig. 1.

In the illustrated apparatus, the tank or vessel 1 is an air-tight horizontally disposed cylindrical drum which is supported on standards 2. Within the drum is a cylindrical rotary cage or hollow drum 3 in which the materials to be treated are packed. The cage 3 is made of sheet iron provided with a large number of perforations 4 so that the liquor in the tank has free access to the contents of the cage. The cage 3 is rotatably supported by means of a shaft 5 the projecting ends of which form trunnions which are journaled in bearings 6 and 7 at the ends of the tank. The shaft 5 is turned to rotate the cage 3 by means of a gear 9 which is driven from a worm 10. The cage 3 has a plate or partition 15 which extends between the shaft 5 and the cylindrical wall of the cage and extends the entire length of the cage. The purpose of the partition 15 is to cause the materials in the cage to be rotated with the cage. The cage 3 is provided on one side with a manhole 20 having a removable cover 21. Opposite the manhole 20 at the top of the tank 1 is a manhole 22 which has a removable cover 23. The materials are introduced and packed into the cage through the manholes 20 and 22.

One end of the tank is provided with a removable end closure or door 25 which is hung on hinges 26. A number of clamping screws 27 are provided for clamping the end closures to make a steam tight joint. The bearing 6 for the trunnion formed by the free end of the shaft 5 is formed on the inside of the closure 25. During the normal operation of the apparatus the bearing 6 supports the weight of the adjacent end of the cage.

The end of the cage next to the closure 25 is closed by means of a removable closure or door 30. The closure 30 is a circular perforated sheet metal disk which is provided with handles 34 so that it may be easily removed. The cylindrical portion of the cage is supported at this end by means of a spider which comprises three arms 32, the inner ends of which are threaded in a hub 33 mounted on the shaft 5 and the outer ends of which are riveted to the cylindrical sheet metal portion of the cage. The end closure 30 fits against the spider arms 32 and is held in place by means of retaining rods 35. The outer ends of the rods 35 fit through holes 36 in a collar or flange 37 which is riveted to the sheet metal cylindrical portion of the drum and which projects beyond the closure 30. The inner ends of the rods 35 are secured to the hub 33 by means of thumb screws 36.

When the end closures 25 and 30 are removed the entire end of the cage 3 is open for the discharge of the materials. In order to support the free end of the cage 3 when the end bearing 6 is removed upon the opening of the closure 25, two supporting rolls 40 are provided. The term "free" is applied to the end of the cage next to the closure 25 because when the closure 25 is open, the supporting bearing 6 no longer holds the end of the shaft which is then free from support. The rolls 40 are mounted on a downwardly extending bracket 41 which is secured to the inside of the top of the end frame 42 of the tank 1. The rolls 40 project inside of the flange or collar 37 so that when the closure 25 is open, the rolls 40 will support the free end of the cage. When the closure 25 is in place and the bearing 6 supports the end of the cage, there is a little clearance between the inside of the collar 37 and the rolls 40. It will be noted that the bearing 6 is slightly tapered and that the trunnion formed by the end of the shaft 5 is also tapered. Consequently, when the closure 25 is being pushed into place, the tapered end of the trunnion will be engaged and slightly raised so as to lift the weight of the cage from the rolls 40. Two rollers 43 and 44 are mounted on the inside of the frame of the tank to engage the outside of the flange or collar 37 and prevent the cage 3 from striking the side of the tank when it is supported from the rolls 40.

The lower part of the tank is provided with a steam jacket 50 for the purpose of boiling the liquor in the tank. The steam is admitted through a steam pipe 51. A pipe 17 is connected to the end of the hollow shaft 5 and serves to lead water into the shaft from which it is discharged into the tank through the perforations 14. Pipe connections 60 are provided for introducing and withdrawing treating liquors. Another pipe connection 61 is provided for the overflow of wash water. The drip water from the steam jacket 50 runs away through a drip pipe 55. The materials to be treated are packed in the cage 3 through the manholes 20 and 22 and are treated with the necessary treating liquors and are then washed. The method of treating fibrous materials for which the illustrated apparatus is particularly designed is described in detail and claimed in my co-pending application, Serial No. 1,959, filed of even date herewith. After the materials have been operated upon they are discharged from the cage 3 by removing the end closures 25 and 30 and rotating the cage. When the end closures 25 and 30 are removed, the entire end of the cage 3 is open so that as the cage 3 is rotated the materials are rapidly emptied from the open end. The partition plate 15 prevents the materials from being twisted and matted so that they readily loosen and are discharged as the cage rotates. The partition plate 15 also serves to carry the materials to the top of the cage and then drops them to the bottom of the cage when the cage is partially emptied. This tumbling of the materials in the cage due to the action of the plate 15, assists in the rapid discharge or falling of the materials out of the open end of the cage.

The present invention is not limited to its illustrated embodiment but may be embodied in other constructions within the scope of the claims.

I claim:—

1. Apparatus for treating fibrous materials, having in combination, a tank having an end closure, a cage rotatably mounted in the tank and having a removable end closure so that the materials in the cage may be emptied by opening the end closures of the tank and cage and rotating the cage.

2. Apparatus for treating fibrous materials having, in combination, a tank having a removable end closure, a cage rotatably mounted in the tank, a bearing mounted on the removable end closure for rotatably supporting one end of the cage, a removable end closure for the cage, a supplemental support for rotatably supporting the end of the cage when the removable end closure of the tank is removed.

3. Apparatus for treating fibrous materials having, in combination, a tank, a removable end closure for the tank, a bearing supported by the end closure, a cage rotatably mounted in the tank and having a trunnion journaled in the bearing to support one end of the cage, a roller mounted in the tank for engaging and rotatably supporting the free end of the cage when the end closure is removed, and a removable closure for the free end of the cage.

4. Apparatus for treating fibrous materials having, in combination, a horizontally disposed closed tank, a removable end closure for the tank having a bearing supported by the end closure, a cage rotatably mounted in the tank and having a trunnion journaled in the said bearing to support the end of the cage, one or more rollers engaging the free end of the cage at its periphery for rotatably supporting it when the end closure is removed, and a removable closure for the end of the cage.

5. Apparatus for treating fibrous materials having, in combination, a cylindrical horizontally disposed closed tank, a removable head at one end of the tank, a bearing mounted in the center of the head, a cylindrical cage mounted in the tank and having a trunnion journaled in the bearing to support the end of the cage, an annular flange projecting from the free end of the cage, one or more rollers supported at the top of the tank and engaging the inner periphery of the flange for rotatably supporting the free end of the cage when the head of the tank is removed, and a removable end closure for the free end of the cage.

6. Apparatus for treating fibrous materials having, in combination, a tank having a removable end closure, a bearing supported by the end closure, a cage rotatably mounted in the tank and having a trunnion journaled in the bearing to support the end of the cage, an annular flange at the free end of the cage, one or more rollers supported at the top of the tank and engaging the inner periphery of the flange for rotatably supporting the free end of the cage when the end closure is removed, and a removable end closure for the free end of the cage.

7. Apparatus for treating fibrous materials having, in combination, a tank having an end closure, a cage rotatably mounted in the tank and having a removable end closure so that the materials in the cage may be emptied by opening the end closures of the tank and cage and rotating the cage, and means in the cage for tumbling the materials during the emptying to assist in the rapid discharge of the materials from the open end of the cage.

8. Apparatus for treating fibrous materials having, in combination, a tank having a removable end closure, a cage rotatably mounted in the tank and having a removable end closure so that the materials in the cage may be emptied by opening the end closures of the tank and cage and rotating the cage, and a plate extending inward from the periphery of the cage for engaging the materials and tumbling them during the emptying operation to cause their more rapid discharge.

EUGENE D. JEFFERSON.

Witnesses:
GEORGE E. STEBBINS,
BESSIE J. SMITH.

Copies of this patent may be obtained for five cents each, by addressing the "Commissioner of Patents, Washington, D. C."